(12) United States Patent
Lin et al.

(10) Patent No.: US 11,791,496 B2
(45) Date of Patent: Oct. 17, 2023

(54) METAL-ION BATTERY

(71) Applicant: Industrial Technology Research Institute, Hsinchu (TW)

(72) Inventors: Cong-You Lin, New Taipei (TW); Che-Wei Chang, Taichung (TW); Ting-Wei Huang, Hsinchu (TW); Chien-Chih Chiang, New Taipei (TW); Chang-Chung Yang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 384 days.

(21) Appl. No.: 16/593,698

(22) Filed: Oct. 4, 2019

(65) Prior Publication Data

US 2020/0212476 A1 Jul. 2, 2020

(30) Foreign Application Priority Data

Dec. 27, 2018 (TW) .................................. 107147398

(51) Int. Cl.
*H01M 10/054* (2010.01)
*H01M 10/0568* (2010.01)
(Continued)

(52) U.S. Cl.
CPC ......... *H01M 10/054* (2013.01); *H01M 4/133* (2013.01); *H01M 4/134* (2013.01);
(Continued)

(58) Field of Classification Search
CPC ............. H01M 10/054; H01M 50/431; H01M 10/0568; H01M 10/0569; H01M 4/134; H01M 4/133
See application file for complete search history.

(56) References Cited

U.S. PATENT DOCUMENTS 4,197,169 A 4/1980 Zahn et al.
4,371,433 A 2/1983 Balko et al.
(Continued)

FOREIGN PATENT DOCUMENTS

CN 1208864 C 6/2005
CN 101662020 A * 3/2010
(Continued)

OTHER PUBLICATIONS

Taiwanese Office Action and Search Report for Taiwanese Application No. 108144886, dated Jul. 2, 2020.
(Continued)

*Primary Examiner* — Matthew T Martin
*Assistant Examiner* — Bartholomew A Hornsby
(74) *Attorney, Agent, or Firm* — Birch, Stewart, Kolasch & Birch, LLP

(57) ABSTRACT

A metal-ion battery is provided. The metal-ion battery can include a negative electrode, a positive electrode, a separator, and an electrolyte, wherein the positive electrode and the negative electrode are separated by the separator and the electrolyte is disposed between the positive electrode and the negative electrode. The negative electrode can include a negative electrode current-collector and a negative electrode active layer, wherein the negative electrode current-collector has a porous structure and the negative electrode current-collector directly contacts to the surface of the negative electrode active layer. The electrolyte can include an ionic liquid and a metal halide.

14 Claims, 1 Drawing Sheet

(51) Int. Cl.

| | | |
|---|---|---|
| *H01M 10/0569* | (2010.01) | |
| *H01M 4/134* | (2010.01) | |
| *H01M 4/133* | (2010.01) | |
| *H01M 4/587* | (2010.01) | |
| *H01M 4/66* | (2006.01) | |
| *H01M 4/80* | (2006.01) | |
| *H01M 4/38* | (2006.01) | |
| *H01M 50/44* | (2021.01) | |
| *H01M 50/437* | (2021.01) | |
| *H01M 4/02* | (2006.01) | |

(52) U.S. Cl.
CPC ............ *H01M 4/38* (2013.01); *H01M 4/587* (2013.01); *H01M 4/661* (2013.01); *H01M 4/808* (2013.01); *H01M 10/0568* (2013.01); *H01M 10/0569* (2013.01); *H01M 50/437* (2021.01); *H01M 50/44* (2021.01); *H01M 2004/021* (2013.01); *H01M 2300/0045* (2013.01)

(56) References Cited

U.S. PATENT DOCUMENTS

| | | | |
|---|---|---|---|
| 6,475,661 | B1 | 11/2002 | Pellegri et al. |
| 7,811,709 | B2 | 10/2010 | Musha et al. |
| 9,734,955 | B2 | 8/2017 | Zhu et al. |
| 2010/0035153 | A1 | 2/2010 | Thackeray et al. |
| 2012/0237827 | A1 | 9/2012 | Fukunaga et al. |
| 2013/0130124 | A1 | 5/2013 | Fukunaga et al. |
| 2015/0180027 | A1 | 6/2015 | Thackeray et al. |
| 2016/0111752 | A1* | 4/2016 | Fukunaga ......... H01M 10/0566 429/103 |
| 2016/0301096 | A1* | 10/2016 | Zhamu ................... H01G 11/24 |
| 2017/0047605 | A1 | 2/2017 | Chang et al. |
| 2017/0237127 | A1* | 8/2017 | Ishikawa ................ H01G 11/52 429/234 |
| 2017/0338513 | A1* | 11/2017 | Chiang ................. H01M 4/133 |
| 2017/0338514 | A1* | 11/2017 | Chiang ............. H01M 10/0563 |
| 2018/0130998 | A1* | 5/2018 | Parker .................. H01M 12/08 |
| 2018/0219257 | A1 | 8/2018 | Huang et al. |
| 2018/0331364 | A1* | 11/2018 | Speed ................. H01M 10/052 |
| 2018/0366763 | A1* | 12/2018 | Wang Chen ...... H01M 10/0567 |

FOREIGN PATENT DOCUMENTS

| | | | | |
|---|---|---|---|---|
| CN | 101662020 | A1 * | 3/2010 | |
| CN | 101862020 | A | 3/2010 | |
| CN | 103554853 | A | 1/2014 | |
| CN | 104093887 | A | 10/2014 | |
| CN | 104659332 | A | 5/2015 | |
| CN | 105977526 | A * | 9/2016 | |
| CN | 107394271 | A | 11/2017 | |
| CN | 207503814 | U | 5/2018 | |
| CN | 207993962 | U | 10/2018 | |
| CN | 109004255 | A | 12/2018 | |
| JP | H08236120 | A * | 3/1995 | .............. H01M 4/80 |
| JP | H08236120 | A * | 9/1995 | |
| JP | 08236120 | A * | 9/1996 | .............. C25D 1/04 |
| KR | 10-2018-0103453 | A | 9/2018 | |
| TW | 355851 | B | 4/1999 | |
| TW | I237417 | B | 8/2005 | |
| TW | I517485 | B | 1/2016 | |
| TW | I606630 | B | 11/2017 | |
| WO | WO 98/21767 | A2 | 5/1998 | |
| WO | WO-2018222609 | A1 * | 12/2018 | ............ H01M 12/08 |

OTHER PUBLICATIONS

Chinese Office Action and Search Report, dated Dec. 11, 2020, for Chinese Application No. 201910444710.6.

Chang et al., "Development of Integrally Molded Bipolar Plates for All-Vanadium Redox Flow Batteries," Energies, vol. 9, No. 350, 2016, pp. 1-10.

Chen et al., "New Understanding of Mode Switching in the Fluidic Precessing Jet Flow," J. Fluids Engineering, vol. 139, 071102, Jul. 2017, pp. 1-10.

Kazazi et al., "High surface area $TiO_2$ nanospheres as a high-rate anode material for aqueous aluminuim-ion batteries," Solid State Ionics, vol. 300, 2017, pp. 32-37.

Taiwanese Office Action issued in Application No. 107147398, dated May 9, 2019.

Wong et al., "The naturally oscillating flow emerging from a fluidic precessing jet nozzle," J. Fluid Mech., vol. 606, 2008, pp. 153-188.

D. Munoz-Torrero et al; Journal of Power Sources 374 (2018) 77-83; Investigation of different anode materials for aluminium rechargeable batteries; pp. 1-7.

* cited by examiner

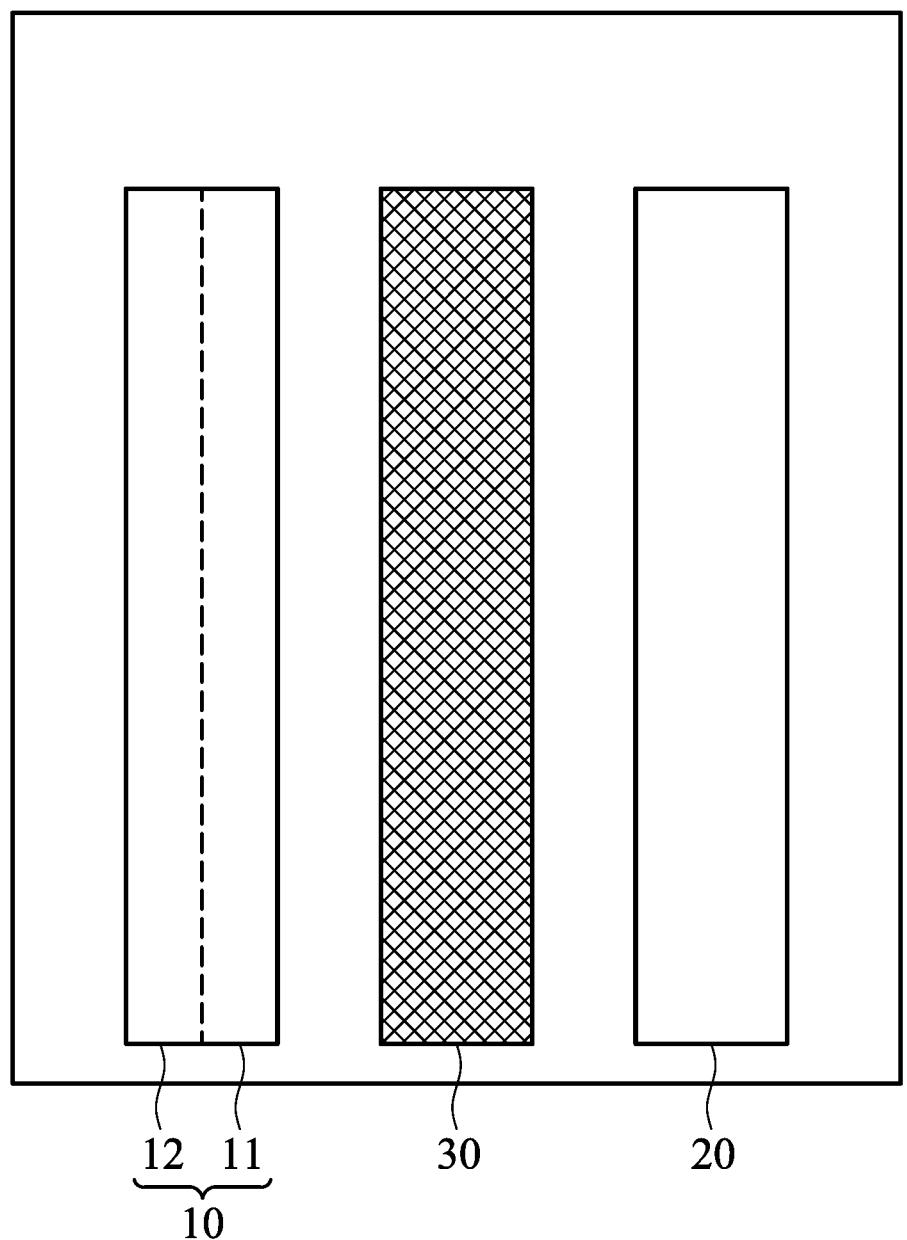

METAL-ION BATTERY

CROSS REFERENCE TO RELATED APPLICATIONS

The application is based on, and claims priority from, Taiwan Application Serial Number 107147398, filed on Dec. 27, 2018, the disclosure of which is hereby incorporated by reference herein in its entirety.

TECHNICAL FIELD

The disclosure relates to a metal-ion battery.

BACKGROUND

An aluminum-ion battery might offer significant safety improvements because of aluminum's low flammability and low electronic redox properties. In general, an aluminum-ion battery consists of an aluminum negative electrode, a separator, a positive electrode and an electrolyte. However, the aluminum negative electrode is consumed and the area of the aluminum negative electrode is reduced during continuous charging and discharging. This may even result in pitting corrosion and fragmentation of the aluminum negative electrode. This is due to the deposition and dissolution (accompanied by self-corrosion) of the aluminum negative electrode. As a result, the whole current density is increased, resulting in local heating of the battery core and severe irreversible disability. Therefore, performance suffers and the lifespan of the battery is reduced. Furthermore, the performance of rapid charging and discharging of aluminum-ion batteries should be further enhanced.

Therefore, there is a need to develop a novel battery, which reduces or inhibits the consumption of the aluminum negative electrode in order to prolong the lifespan and improve the performance thereof.

SUMMARY

According to embodiments of the disclosure, the disclosure provides a metal-ion battery, can include a negative electrode, a positive electrode, a separator, and an electrolyte. The positive electrode and the negative electrode are separated by the separator. The electrolyte is disposed between the positive electrode and the negative electrode, and the electrolyte can include an ionic liquid and a metal halide. The negative electrode includes a negative electrode current-collector and a negative electrode active layer, and the negative electrode current-collector directly contacts a surface of the negative electrode active layer, wherein the negative electrode current-collector has a porous structure.

A detailed description is given in the following embodiments with reference to the accompanying drawings.

BRIEF DESCRIPTION OF THE DRAWINGS

FIG. 1 is a schematic view of the metal-ion battery according to an embodiment of the disclosure.

DETAILED DESCRIPTION

The metal-ion battery of the disclosure is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In the drawings, the size, shape, or thickness of some of the elements may be exaggerated and not drawn on scale for illustrative purposes. The disclosure will be described with respect to particular embodiments and with reference to certain drawings but the disclosure is not limited thereto.

According to an embodiment of the disclosure, the metal-ion battery includes a negative electrode, wherein the negative electrode includes a current-collector and an active layer. By means of the composite design of the current-collector with a porous structure and the active layer with high specific surface area, the metal-ion battery not only achieves rapid charging and discharging but also enhances the electric field uniformity of the negative electrode surface, resulting in prolonging the lifespan of the metal-ion battery.

FIG. 1 is a schematic view of the metal-ion battery 100 according to an embodiment of the disclosure. The metal-ion battery 100 can include a negative electrode 10, a positive electrode 20, a separator 30, and an electrolyte (not shown), wherein the separator 30 is disposed between the negative electrode 10 and the positive electrode 20 to separate the negative electrode 10 and the positive electrode 20 from each other, preventing the positive electrode 20 from coming into direct contact with the negative electrode 10. The metal-ion battery 100 further includes an electrolyte composition disposed between the positive electrode 20 and the negative electrode 10 in the battery. Thus, the electrolyte composition comes into contact with the positive electrode 20 and the negative electrode 10.

According to an embodiment of the disclosure, the negative electrode 10 can include a negative electrode current-collector 11 and a negative electrode active layer 12, wherein the negative electrode current-collector 11 directly contacts the surface of the negative electrode active layer 12. In one embodiment, the negative electrode 10 can consist of a negative electrode current-collector 11 and a negative electrode active layer 12, wherein the negative electrode current-collector 11 directly contacts the surface of the negative electrode active layer 12. The negative electrode current-collector 11 can have a porous structure, such as three-dimensional network structure or foam structure. Suitable material of the negative electrode current-collector 11 can include aluminum, nickel, molybdenum, tungsten, tantalum, carbon, titanium, chromium, cobalt, tin, lead, copper, mercury, gold, silver, platinum, beryllium, iron, titanium nitride, conductive polymer, or a combination thereof. The conductive polymer can be polyaniline, polypyrrole, polythiophene, polystyrene, or derivatives thereof. In one embodiment, suitable material of the negative electrode current-collector 11 can be a conductive material which has a relatively low redox activity in comparison with the active material of the negative electrode active layer 12. For example, when the active material of the negative electrode active layer 12 is aluminum, the material of the negative electrode current-collector 11 can include nickel, molybdenum, tungsten, tantalum, carbon, titanium, chromium, cobalt, tin, lead, copper, mercury, gold, silver, platinum, beryllium, or iron. In one embodiment, negative electrode current-collector 11 can be nickel mesh, nickel foam, molybdenum mesh, or molybdenum foam. In one embodiment, the negative electrode current-collector can have a porosity from about 10% to 99.9%, such as from about 50% to 99.9%. The porosity P can be measured by the following equation: $P=V1/V2 \times 100\%$, wherein V1 is the volume of the pores of the negative electrode current-collector, and V2 is the total volume of the negative electrode current-collector. A porosimeter can be used to determine the porosity.

In one embodiment, the negative electrode active layer 12 can be a metal sheet, wherein the metal sheet can include sodium, potassium, aluminum, magnesium, zinc, an alloy thereof, or a combination thereof. In one embodiment, the metal sheet consists of sodium, potassium, aluminum, magnesium, or zinc. In one embodiment, the material of the negative electrode current-collector has a relatively low redox activity in comparison with the metal sheet. In one embodiment, the metal sheet surface has a porous structure, and the capacitance per unit area of the metal sheet can be greater than $0.5 \, \mu F/cm^2$, such as from about $0.6 \, \mu F/cm^2$ to $600 \, \mu F/cm^2$.

In comparison with a smooth metal sheet, a similar metal sheet having a porous structure would exhibit a relatively high specific surface area and a relatively high capacitance per unit area. Thus, the specific surface area variety of the metal sheet can be represented by the capacitance per unit area variety of the metal sheet. The capacitance per unit area can be determined based on EIAJ RC-2364A.

In one embodiment, the thickness of the metal sheet can be from 1 μm to 10,000 μm, such as 10 μm to 5,000 μm. The thickness of the metal sheet can be optionally adjusted according to the requirements or uses. When the metal sheet having a relatively high specific surface area, the thickness of the metal sheet should be increased, so that the fragmentation probability of the metal sheet would be reduced. The porous structure of the metal sheet can be formed by a process, wherein the process can be a grinding process, plasma treatment, casting process, foaming process, deposition, or sintering process. In one embodiment, a negative electrode, which includes a negative electrode current-collector and a negative electrode active layer (said metal sheet), can be obtained by directly welding or pressing the metal sheet with the negative electrode current-collector, resulting in that the negative electrode current-collector is directly bonded to a surface of the negative electrode active layer (said metal sheet). The process for pressing can be a rolling compaction, scrolling compaction, or oil-pressure process. In one embodiment, a negative electrode current-collector is disposed on one side of the metal sheet, obtaining a negative electrode having a structure represented by negative electrode current-collector/negative electrode active layer (said metal sheet). In one embodiment, a negative electrode current-collector is disposed on one side of the metal sheet and another negative electrode current-collector is disposed on another side of the metal sheet, obtaining a negative electrode having a structure represented by negative electrode current-collector/negative electrode active layer (said metal sheet)/negative electrode current-collector.

In one embodiment, the negative electrode active layer 12 can be a film, the film can include a metal powder. By means of the metal powder, the surface area for contacting by electrolyte can be increased. The metal powder can include sodium, potassium, aluminum, magnesium, zinc, an alloy thereof, or a combination thereof. In one embodiment, the material of the negative electrode current-collector has a relatively low redox activity in comparison with the metal powder. The metal powder can have a particle size from 1 μm to 50 μm, such as from 1 μm to 40 μm, or from 4 μm to 20 μm. The film can further include an adhesive, wherein the adhesive can be carboxymethyl cellulose (CMC), styrene butadiene rubber (SBR), poly(acrylic acid) (PAA), polyvinylidene fluoride (PVDF), or a combination thereof. The weight ratio of the metal powder to the adhesive can be from 0.5:99.5 to 99.5:0.5. In one embodiment, the metal powder, the adhesive and a solvent are mixed uniformly to form a coating composition, and the coating composition is coated on all surfaces or a part of surfaces of the negative electrode current-collector. After drying, a negative electrode (having the negative electrode current-collector and the negative electrode active layer) is obtained, wherein the negative electrode current-collector is bonded on the surface of the negative electrode active layer. The solvent and the amount of solvent are not limited, on the premise that the metal powder and the adhesive can be uniformly distributed in the solvent. The solvent can be water, N-methyl pyrrolidinone (NMP), isopropanol, or dimethyl phthalate (DMP).

As shown in FIG. 1, the negative electrode 10 can include a negative electrode current-collector 11 and a negative electrode active layer 12, wherein the negative electrode current-collector 11 is disposed between the negative electrode active layer 12 and the separator 30, but the disclosure is not limited thereto. For example, in another embodiment, the negative electrode active layer 12 can be disposed between the negative electrode current-collector 11 and the separator 30. In some embodiments, the negative electrode 10 consists of the negative electrode current-collector 11 and the negative electrode active layer 12.

In one embodiment, the positive electrode 20 can include a positive electrode active layer and a positive electrode current-collecting layer. The positive electrode active layer can include a positive electrode active material, wherein the positive electrode active material can be a layered active layer. In one embodiment, the layered active layer can include graphite, carbon nanotube, graphene, or a combination thereof. In one embodiment, the positive electrode active layer can further include an adhesive, the adhesive can be carboxymethyl cellulose (CMC), styrene butadiene rubber (SBR), poly(acrylic acid) (PAA), or a combination thereof. The positive electrode current-collecting layer can be a conductive carbon substrate, nickel foam, nickel foil, or nickel mesh. In one embodiment, the conductive carbon substrate can be carbon cloth, carbon felt, or carbon paper.

In one embodiment, the electrolyte can include an ionic liquid and a metal halide, wherein a molar ratio of the metal halide to the ionic liquid can be from 1.1:1 to 2.1:1, such as from 1.1:1 to 1.8:1. The metal halide can be aluminum halide, silver halide, copper halide, iron halide, cobalt halide, zinc halide, indium halide, cadmium halide, nickel halide, tin halide, chromium halide, lanthanum halide, yttrium halide, titanium halide, manganese halide, molybdenum halide, or a combination thereof. In one embodiment, the metal halide can be aluminum halide. The ionic liquid can be alkylimidazolium salt, alkylpyridinium salt, alkylfluoropyrazolium salt, alkyltriazolium salt, aralkylammonium salt, alkylalkoxyammonium salt, aralkylphosphonium salt, aralkylsulfonium salt, or a combination thereof. For example, when the metal halide is aluminum halide, the ionic liquid can be 1-ethyl-3-methylimidazolium chloride.

An ionic liquid electrolyte can be doped (or have additives added) to increase electrical conductivity and lower viscosity, or it can be otherwise altered to yield compositions that favor the reversible electrodeposition of metals. In one embodiment, the electrolyte can further include urea, acetamide, choline chloride, ethylchlorine chloride, alkali halide, dimethyl sulfoxide (DMSO), or a combination thereof.

In one embodiment, the separator 30 can be glass fiber, polyethylene (PE), polypropylene (PP), non-woven fabric, wood fiber, poly(ether sulfone) (PES), ceramic fiber, or a combination thereof.

The elements of the metal-ion battery of the disclosure can include a negative electrode, a positive electrode, a separator, and an electrolyte, wherein the negative electrode can include the negative electrode active layer and the negative electrode current-collector, wherein the electrolyte is disposed between the negative electrode and the positive electrode. In one embodiment, the metal-ion battery can include the negative electrode active layer, the negative electrode current-collector, the positive electrode, the separator, and the electrolyte, wherein the sequence of the elements can be negative electrode active layer/negative electrode current-collector/separator/positive electrode. Further, the sequence of the elements can be adjusted optionally. For example, the sequence of the elements can be negative electrode current-collector/negative electrode active layer/separator/positive electrode. In some embodiments, the elements of the battery can be duplicated and stacked. For example, the sequence of the elements can be positive electrode/separator/negative electrode current-collector/negative electrode active layer/negative electrode current-collector/separator/positive electrode. Further, the sequence of the elements can be positive electrode/separator/negative electrode active layer/negative electrode current-collector/negative electrode active layer/separator/positive electrode. The sequence of the negative electrode active layer and negative electrode current-collector relative to other elements would affect the electric field uniformity of the negative electrode and the deposition and dissolution of the metal ion, thereby affecting the lifespan of the metal-ion battery.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Comparative Example 1

First, a glossy aluminum foil (with a thickness of 0.05 mm and a capacitance per unit area of 0.5 µF/cm$^2$) was cut to obtain a negative electrode (having a size of 35 mm×70 mm).

Next, a positive electrode (i.e. an active layer (such as natural graphite) disposed on a current-collecting layer (such as nickel foam)) (having a size of 35 mm×70 mm) was provided. Next, a separator (a glass filter paper with trade No. Whatman GFC) was provided. Next, the negative electrode, the separator, and the positive electrode were placed in sequence and sealed within an aluminum plastic pouch. Next, an electrolyte (including aluminum chloride (AlCl$_3$) and 1-ethyl-3-methylimidazolium chloride (EMIC), wherein the molar ratio between AlCl$_3$ and EMIC was about 1.4:1) was injected into the aluminum plastic pouch, obtaining Aluminum-ion battery (1).

Next, Aluminum-ion battery (1) was then charged and discharged at charge rate and discharge rate of 1C/1C, 3C/3C, 5C/5C, 7C/7C, and 10C/10C individually by NEWARE battery analyzer (BST408-5V-10A) to analyze the discharge specific capacity. Further, the capacity retention of Aluminum-ion battery (1) was measured by determining the discharge specific capacity on the first charging/discharging cycle and the discharge specific capacity on the 100$^{th}$ charging/discharging cycle (at charge rate and discharge rate of 1C/1C). The results are shown in Table 1.

Example 1

First, a glossy aluminum foil (with a thickness of 0.05 mm and a capacitance per unit area of 0.5 µF/cm$^2$) and a nickel foam (with a porosity of about 99.8%) were provided. Next, the aluminum foil was fixed to the nickel foam by welding. The result was cut to obtain a negative electrode (having a size of 35 mm×70 mm).

Next, a positive electrode (i.e. an active layer (such as natural graphite) disposed on a current-collecting layer (such as nickel foam)) (having a size of 35 mm×70 mm) was provide. Next, a separator (a glass filter paper with trade No. Whatman GFC) was provided. Next, the negative electrode (aluminum foil/nickel foam), the separator and, the positive electrode were placed in sequence and sealed within an aluminum plastic pouch. Next, an electrolyte (including aluminum chloride (AlCl$_3$) and 1-ethyl-3-methylimidazolium chloride (EMIC), wherein the molar ratio between AlCl$_3$ and EMIC was about 1.4:1) was injected into the aluminum plastic pouch, obtaining Aluminum-ion battery (2).

Next, Aluminum-ion battery (2) of Example 1 was then charged and discharged at charge rate and discharge rate of 1C/1C, 3C/3C, 5C/5C, 7C/7C, and 10C/10C individually by NEWARE battery analyzer (BST408-5V-10A) to analyze the discharge specific capacity. Further, the capacity retention of Aluminum-ion battery (2) was measured by determining the discharge specific capacity on the first charging/discharging cycle and the discharge specific capacity on the 100$^{th}$ charging/discharging cycle (at charge rate and discharge rate of 1C/1C). The results are shown in Table 1.

Example 2

First, a glossy aluminum foil (with a thickness of 0.05 mm and a capacitance per unit area of 0.5 µF/cm$^2$) was provided. Next, the surface of the glossy aluminum foil was subjected to a roughening treatment by plasma etching, obtaining a roughened aluminum foil with a capacitance per unit area of 420 µF/cm$^2$g. Next, a nickel foam (with a porosity of about 99.8%) was provided. Next, the aluminum foil was fixed to the nickel foam by welding. The result was cut to obtain a negative electrode (having a size of 35 mm×70 mm).

Next, a positive electrode (i.e. an active layer (such as natural graphite) disposed on a current-collecting layer (such as nickel foam)) (having a size of 35 mm×70 mm) was provide. Next, a separator (a glass filter paper with trade No. Whatman GFC) was provided. Next, the negative electrode (roughened aluminum foil/nickel foam), the separator, and the positive electrode were placed in sequence and sealed within an aluminum plastic pouch. Next, an electrolyte (including aluminum chloride (AlCl$_3$) and 1-ethyl-3-methylimidazolium chloride (EMIC), wherein the molar ratio between AlCl$_3$ and EMIC was about 1.4:1) was injected into the aluminum plastic pouch, obtaining Aluminum-ion battery (3).

Next, Aluminum-ion battery (3) of Example 2 was then charged and discharged at charge rate and discharge rate of 1C/1C, 3C/3C, 5C/5C, 7C/7C, and 10C/10C individually by NEWARE battery analyzer (BST408-5V-10A) to analyze the discharge specific capacity. Further, the capacity retention of Aluminum-ion battery (3) was measured by determining the discharge specific capacity on the first charging/discharging cycle and the discharge specific capacity on the 100$^{th}$ charging/discharging cycle (at charge rate and discharge rate of 1C/1C). The results are shown in Table 1.

1C/1C, 3C/3C, 5C/5C, 7C/7C, and 10C/10C individually by NEWARE battery analyzer (BST408-5V-10A) to analyze the discharge specific capacity. The result shows that the discharge specific capacities at charge rate and discharge rate of 1C/1C, 3C/3C, 5C/5C, 7C/7C, and 10C/10C are 76.3 mAh/g, 65.0 mAh/g, 60.0 mAh/g, 54.2 mAh/g, and 41.6 mAh/g respectively.

It will be clear that various modifications and variations can be made to the disclosed methods and materials. It is intended that the specification and examples be considered as exemplary only, with the true scope of the disclosure being indicated by the following claims and their equivalents.

TABLE 1

| | 1 C/1 C specific capacity (mAh/g) | 3 C/3 C specific capacity (mAh/g) | 5 C/5 C specific capacity (mAh/g) | 7 C/7 C specific capacity (mAh/g) | 10 C/10 C specific capacity (mAh/g) | capacity retention on the 100$^{th}$ charging/discharging cycle @1 C |
|---|---|---|---|---|---|---|
| Comparative Example 1 | 70.8 | 39.1 | 30.8 | 25.8 | 20.8 | 77.6% |
| Example 1 | 80.3 | 58.3 | 54.2 | 46.1 | 40.0 | 95.0% |
| Example 2 | 89.2 | 70.8 | 60.8 | 50.0 | 43.0 | 97.4% |

As shown in Table 1, in comparison with Comparative Example 1, the specific capacity of Aluminum-ion battery (2) of Example 1 at various charge rate and discharge rate and the capacity retention on the 100$^{th}$ charging/discharging cycle (at charge rate and discharge rate of 1C/1C) were obviously improved. It means that the negative electrode, employing the negative electrode current-collector with a porous structure, can achieve rapid charging and discharging of the metal-ion battery and significantly prolong the lifespan of the metal-ion battery. The result of Example 2 shows that the negative electrode can achieve rapid charging and discharging of the metal-ion battery and significantly prolong the lifespan of the metal-ion battery, when the specific surface area of negative electrode active layer is increased.

Example 3

First, 100 g of aluminum powder (available from Alfa) (with an average particle size of 20 μm), 10 g of carboxymethyl cellulose (CMC, available from Nippon Paper Industries CO., LTD.), 1.5 g of styrene butadiene rubber (SBR, available from JSR), and 20 g of water were mixed to form a coating composition. Next, a nickel foam (with a porosity of about 99.8%) was provided. The coating composition was then coated on the nickel foam. After drying at 70° C., the nickel foam was cut, obtaining a negative electrode (having a size of 35 mm×70 mm).

Next, a positive electrode (i.e. an active layer (such as natural graphite) disposed on a current-collecting layer (such as nickel foam)) (having a size of 35 mm×70 mm) was provide. Next, a separator (a glass filter paper with trade No. Whatman GFC) was provided. Next, the negative electrode (roughened aluminum foil/nickel foam), the separator, and the positive electrode were placed in sequence and sealed within an aluminum plastic pouch. Next, an electrolyte (including aluminum chloride (AlCl$_3$) and 1-ethyl-3-methylimidazolium chloride (EMIC), wherein the molar ratio between AlCl$_3$ and EMIC was about 1.4:1) was injected into the aluminum plastic pouch, obtaining Aluminum-ion battery (4).

Next, Aluminum-ion battery (4) of Example 3 was then charged and discharged at charge rate and discharge rate of

What is claimed is:

1. A metal-ion battery, comprising:
   a negative electrode;
   a positive electrode;
   a separator, wherein the positive electrode and the negative electrode are separated by the separator; and
   an electrolyte disposed between the positive electrode and the negative electrode, wherein the electrolyte comprises an ionic liquid and a metal halide,
   wherein the negative electrode consists of one negative electrode current-collector and one negative electrode active layer, wherein the negative electrode active layer is a metal sheet, wherein the metal sheet comprises sodium, potassium, aluminum, magnesium, an alloy thereof, or a combination thereof, wherein the metal sheet surface has a porous structure, and wherein the negative electrode current-collector directly contacts to a surface of the negative electrode active layer, wherein the negative electrode current-collector has a porous structure, and
   wherein the negative electrode current-collector is disposed between the negative electrode active layer and the separator.

2. The metal-ion battery as claimed in claim 1, wherein the negative electrode current-collector comprises nickel, molybdenum, tantalum, carbon, titanium, chromium, cobalt, tin, lead, copper, mercury, gold, silver, platinum, beryllium, iron, titanium nitride, conductive polymer, or a combination thereof.

3. The metal-ion battery as claimed in claim 1, wherein the negative electrode current-collector has a porosity from 10% to 99.9%.

4. The metal-ion battery as claimed in claim 1, wherein the negative electrode current-collector is nickel mesh, nickel foam, molybdenum mesh, or molybdenum foam.

5. The metal-ion battery as claimed in claim 1, wherein the metal sheet has a capacitance per unit area greater than 0.5 μF/cm$^2$, and the sheet has a thickness from 1 μm to 10,000 μm.

6. The metal-ion battery as claimed in claim 1, wherein the positive electrode comprises a positive electrode active layer and a positive electrode current-collecting layer.

7. The metal-ion battery as claimed in claim 6, wherein the positive electrode current-collecting layer is a conductive carbon substrate, nickel foam, nickel foil, or nickel mesh.

8. The metal-ion battery as claimed in claim 7, wherein the conductive carbon substrate is carbon cloth, carbon felt, or carbon paper.

9. The metal-ion battery as claimed in claim 6, wherein the positive electrode active layer comprises a positive electrode active material and the positive electrode active material is a layered active layer, and the layered active layer comprises graphite, carbon nanotube, graphene, or a combination thereof.

10. The metal-ion battery as claimed in claim 1, wherein the molar ratio of the metal halide to the ionic liquid is from 1.1:1 to 2.1:1.

11. The metal-ion battery as claimed in claim 1, wherein the metal halide is aluminum halide, silver halide, copper halide, iron halide, cobalt halide, zinc halide, indium halide, cadmium halide, nickel halide, tin halide, chromium halide, lanthanum halide, yttrium halide, titanium halide, manganese halide, molybdenum halide, or a combination thereof.

12. The metal-ion battery as claimed in claim 1, wherein the ionic liquid comprises alkylimidazolium salt, alkylpyridinium salt, alkylfluoropyrazolium salt, alkyltriazolium salt, aralkylammonium salt, alkylalkoxyammonium salt, aralkylphosphonium salt, aralkylsulfonium salt, or a combination thereof.

13. The metal-ion battery as claimed in claim 1, wherein the electrolyte further comprises urea, acetamide, choline chloride, ethylchlorine chloride, alkali halide, dimethyl sulfoxide (DMSO), or a combination thereof.

14. The metal-ion battery as claimed in claim 1, wherein the separator is glass fiber, polyethylene (PE), polypropylene (PP), non-woven fabric, wood fiber, poly(ether sulfones) (PES), ceramic fiber, or a combination thereof.

* * * * *